May 25, 1926.
A. W. FURNIVALL
GUARD
Filed August 1, 1925
1,586,422
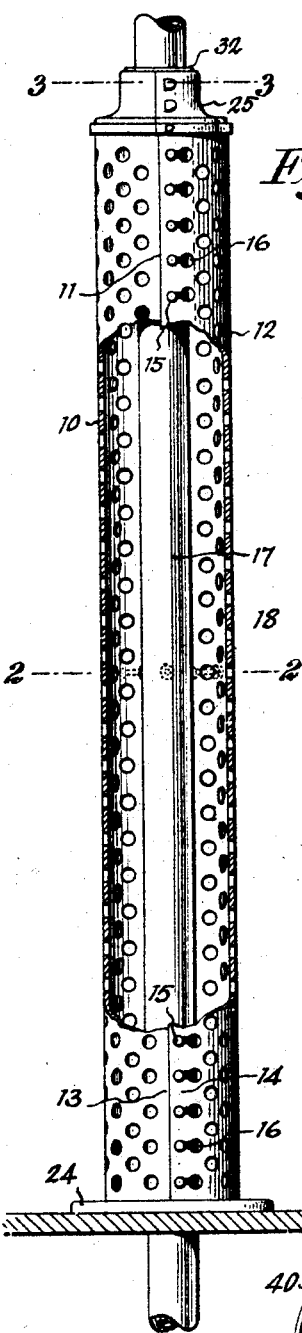
Fig. 1.
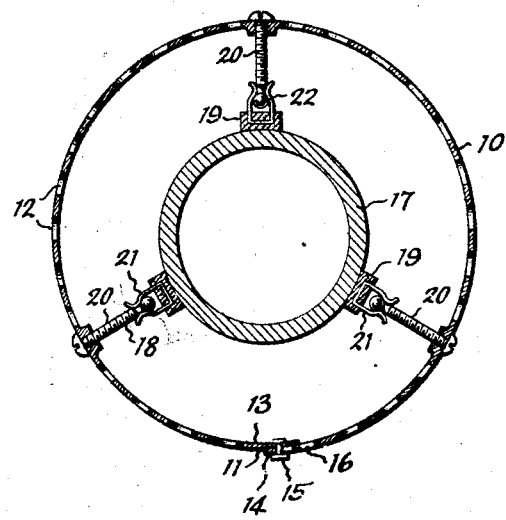
Fig. 2.
Fig. 3.
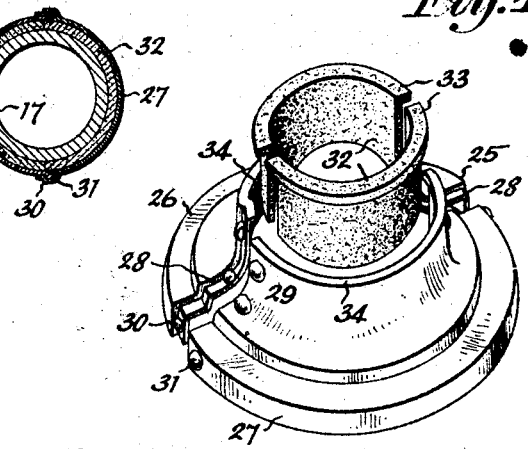
Fig. 4.
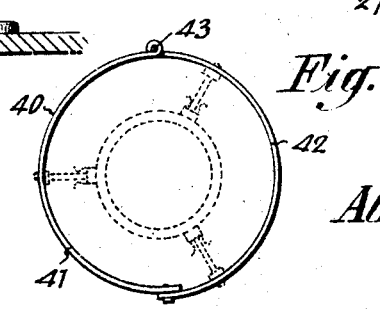
Fig. 5.
WITNESSES
INVENTOR
Alfred W. Furnivall
BY
ATTORNEYS Patented May 25, 1926.

1,586,422

UNITED STATES PATENT OFFICE.

ALFRED W. FURNIVALL, OF BROOKLYN, NEW YORK.

GUARD.

Application filed August 1, 1925. Serial No. 47,574.

This invention relates to guards and protectors and has especial reference to guarding and protecting means associated with heat conduits and the like.

An important object of the present invention is to surround a heat conduit with a shell or casing, which will be insulated from direct contact with the conduit, and which will permit the radiation of heat from the conduit.

Another object of the invention is the provision of a guard or protector which may be readily associated in surrounding relationship with a heat conductor or conduit between floors of a room to constitute a means as a protection to persons against a being burned or otherwise inconvenienced or handicapped when moving about in the room.

Another object of the present invention is the provision of an appurtenance of the character mentioned of simple construction, easy application to use, and one which will be efficient and effectual for carrying out the result looked for.

With the foregoing, other objects of the invention will appear from the embodiments of the invention which by way of example are described in the following specification and illustrated in the accompanying drawings; in which:

Figure 1 is a view illustrating a portion of a heat conduit with the guard of the present invention associated therewith, the guard being shown partly in section and partly in elevation.

Fig. 2 is a horizontal sectional view taken on the line 2—2 of Fig. 1.

Fig. 3 is a horizontal sectional view taken on the line 3—3 of Fig. 1.

Fig. 4 is a perspective view of the end closure with the component parts thereof separated.

Fig. 5 is an end view of a modification of the protecting shell or casing.

In nearly all apartment houses and in some dwellings and office buildings portions of the feeder pipes of the heating systems are exposed between floors of certain rooms such as bathrooms in the case of apartment houses and dwellings, and in offices in the case of office buildings. These unprotected heat conductors or conduits are a source of inconvenience to persons who are required to remain clear of the conduits and who are sometimes severely burned by coming in contact therewith. To safeguard persons against coming in contact with a heat conduit and to permit the heat to properly radiate in accordance with the present invention is accomplished by the appurtenance presently to be described. Use is made of a shell, or casing of any suitable material having the properties of resisting heat and which is flexible. The said shell or casing is divided longitudinally as at 11, is substantially cylindrical in cross section and has holes 12 therein. The meeting portion 13 and 14 at the division 11 are respectively provided with headed members 15 and keyhole openings 16 by virtue of which the shell or casing 10 is held in cylindrical conformation, and which permits the ready separation of the shell or casing for flexing action of the walls to permit the shell or casing to be placed in surrounding relationship with respect to a heat conduit, such as the one designated 17. In order to maintain the shell or casing 10 in proper surrounding relationship with respect to the conduit 17 and to heat insulate the shell from the conduit 17, there are provided heat insulators and spacers 18. Any preferred number of devices 18 may be employed and are preferably employed in groups of three at different points in the length of the shell or casing 10. Each device 18 consists of a block 19 of heat resisting material such as asbestos, a screw 20, a member 21 carried by the block 19 to which one end of the screw 20 is turnably associated by virtue of a ball 22 and spring fingers 23 of the member 21; the crimped portions of the fingers 23 entering the annular groove between the ball 22 and the adjoining portion of the screw. Each of the devices 18 is adjustable by virtue of the threading engagement of the screw in the wall of the shell 10 and thus provision is made for accommodating conduits of various sizes. The lower end of the shell 10 rests on a base plate 24 on the floor, and the upper end of the shell 10 is provided with a cap 25 which constitutes a closure for the upper end of the shell. The cap comprises a part 26 and a part 27. The part 26 is crimped as at 28 so as to accommodate the edges 29 of the part 27. The crimped portion of the part 26 is provided with small convexities 30 which are engageable respectively in concavities 31 on the edges 29 of the part 27 for the detachable connection of the parts 26 and 27. Heat insulating members 32 of asbestos are arranged between the conduit 17 and portions of the cap 25 to heat insulate the cap from the conduit 17. Each of the members 32 is semicircular and is provided with a flange 33 which rests on the upper end portions 34 of the cap.

As shown in Fig. 5 the shell or casing 40 consists of two parts 41 and 42 hingedly connected as at 43. In other respects the shell 40 is similar in construction to the shell 10 and is provided with coacting means for maintaining the separable cylindrical relation of the shell.

From the foregoing it will be apparent that means is provided for encasing a portion of a heat conduit; that the means is heat insulated from the conduit; and that the heat is permitted to freely radiate, thus safeguarding persons against being burned and at the same time obtaining the benefit of the heat radiated.

It is to be understood that the invention is not restricted to the precise arrangement of parts shown and described, as details of construction may be modified and rearranged without departing from the spirit of the invention, the scope of which is limited only by the terms of the appended claims.

I claim:

1. A guard for a pipe and the like which serves for conducting a heating medium, said guard comprising a perforate casing, means permitting the casing to be placed in surrounding relationship to the pipe and the like, and heat insulators and spacers extending radially inward from the casing for maintaining the casing in its surrounding relationship in a heat insulated condition.

2. A divided perforate casing having portions capable of being separated to permit the casing to be placed in surrounding relationship with respect to a pipe or the like, mating means embodied by said portions for detachably connecting said portions together, and an end closure which fits the upper end of the casing, said end closure being of two parts, and means on one of said parts which coacts with means on the other of said parts effecting the detachable connection of said parts.

ALFRED W. FURNIVALL.